United States Patent
Irikura et al.

[15] 3,697,577
[45] Oct. 10, 1972

[54] DERIVATIVES OF N(N-ACYL AMINO ACYL) AMINOACETONITRILE

[72] Inventors: Tsutomu Irikura; Keigo Nishino; Seigo Suzue; Keichi Ushiyama, all of Tokyo; Hirotaka Shinada, Saitama-ken, all of Japan

[73] Assignee: Kyorin Seiyaku Kabushiki Kaisha, Tokyo, Japan

[22] Filed: May 28, 1969

[21] Appl. No.: 828,508

Related U.S. Application Data

[63] Continuation-in-part Ser. No. 449,472, Apr. 20, 1965, Pat. No. 3,467,691.

[30] Foreign Application Priority Data

April 22, 1964 Japan ...................39/22575

[52] U.S. Cl..............................260/465.4
[51] Int. Cl......................C07c 121/44, C07c 103/30
[58] Field of Search..........260/404.5, 465.4; 424/304

[56] References Cited

UNITED STATES PATENTS

| | | | |
|---|---|---|---|
| 2,461,842 | 2/1949 | Olin | 260/465.4 |
| 3,201,458 | 8/1965 | Scheurer et al | 260/465.4 |
| 3,206,491 | 9/1965 | Gubler et al | 260/465.4 |
| 3,211,779 | 10/1965 | Nowak | 260/465.4 |
| 3,511,867 | 5/1970 | Laliberte | 260/465.4 |

FOREIGN PATENTS OR APPLICATIONS

1,073,288  6/1967  Great Britain..........260/465.4

Primary Examiner—Lewis Gotts
Assistant Examiner—G. Hollrah
Attorney—Wenderoth, Lind & Ponack

[57] ABSTRACT

N-(N-acylaminoacyl)-aminoacetonitriles of the formula $$R-CO-NH-CH_2-CN$$
$$|$$
$$NH-CO-R^1$$

in which

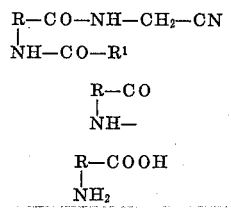

is the radical of representing an amino acid selected from the group consisting of glycine, $\alpha$-alanine, $\beta$-alanine, $\alpha$-aminoisobutyric acid, valine, methionine, lysine, aspartic acid, and $\delta$-aminovaleric acid and $R^1CO$ represents an acyl radical, $R^1$ representing a member selected from the group consisting of straight and branched chain alkyl radicals having from one to four carbon atoms.

15 Claims, 2 Drawing Figures

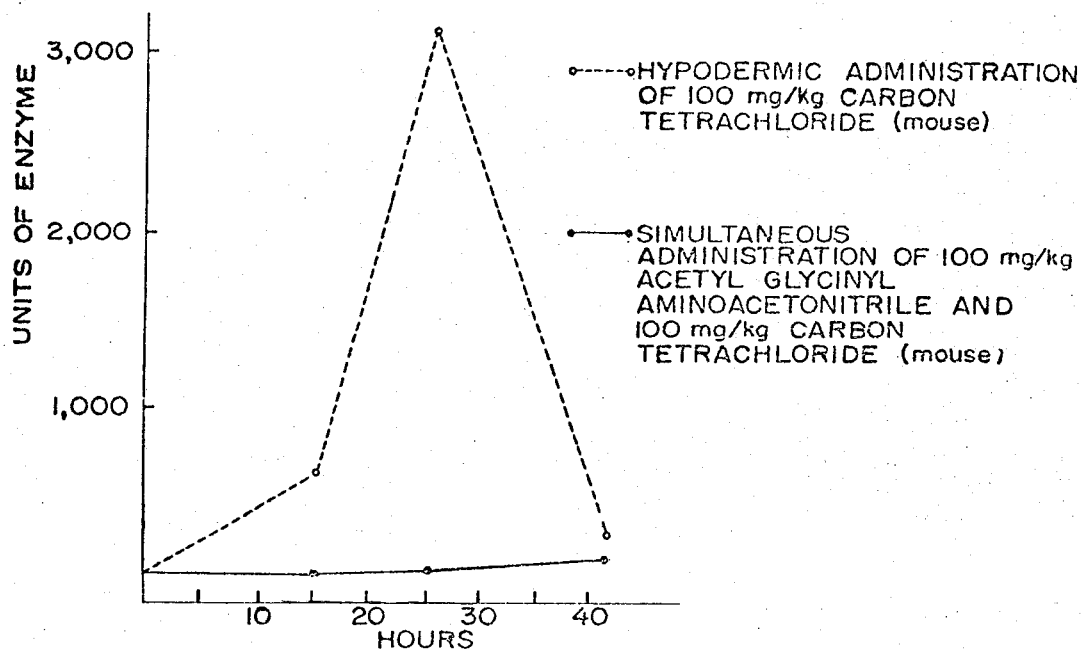
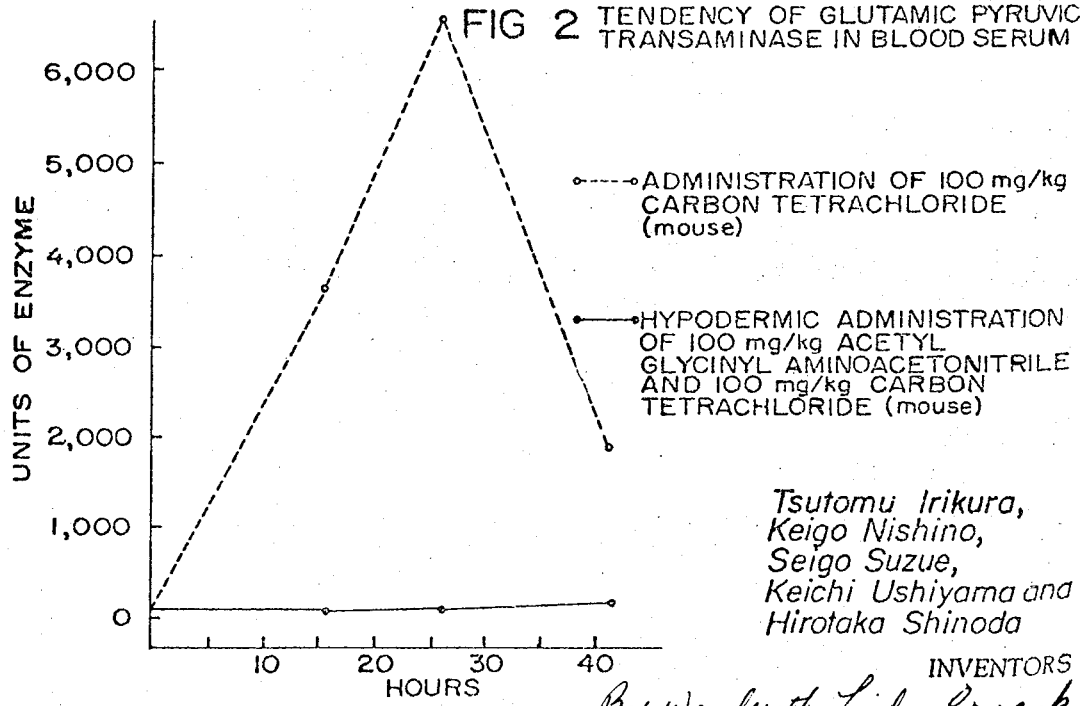

DERIVATIVES OF N(N-ACYL AMINO ACYL) AMINOACETONITRILE

This application is a continuation-in-part of application Ser. No. 449,472, filed Apr. 20, 1965 now U.S. Pat. No. 3,467,691.

The present invention relates to derivatives of N-(N-acylaminoacyl) - aminoacetonitriles of the formula:

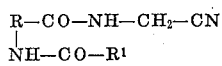

in which

is the residue of

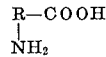

representing amino acids such as glycine, α-alanine, β-alanine, α-aminoisobutyric acid valine, methionine, lysine, tryptophane β-, aspartic acid, phenylalanine, tyrosine, phenyl glycine, δ-amino-valeric acid, etc., and R'-CO represents an acyl radical, $R^1$ representing a straight or branched chain alkyl radical or an aromatic radical.

The present invention is based on our discovery that the secondary effects of an amino acid acylated aminoacetonitrile can be reduced without lowering its liver protecting effects by acylation of the amino radical thereof.

Some of the secondary effects of amino acid acylated aminoacetonitriles will be described in more detail hereinafter.

Aminoacetonitrile, which is the starting substance for the preparation of amino acid acylated aminoacetonitrile, not only has such strong medical effects that it completely prevents liver damage caused by liver damaging substances such as carbon tetrachloride, bromobenzene, thioacetoamide, etc., but it also is capable of regenerating the liver and of preventing liver cirrhosis. On the other hand, however, it has harmful pharmacodynamical effects on the vermiculation of intestines and a strong influence both on the heart rate and the blood pressure to the extent that this substance has no value as medicine.

The aforementioned amino acid acylated aminoacetonitrile has the same degree of liver protecting effect as aminoacetonitrile; and it has become possible to reduce its pharmacodynamical virulence to less than one-tenth. Thus, it has become useful as medicine.

However some interesting facts have been found from biochemical studies on these substances.

Namely, it has been found that the so-called lathyrogenic substance present in the sweet pea causes denaturation (liquescence) of acid muco polysaccharide which is a component of young animal's cartilage, thus causing denaturation of the cartilage and, in addition, suppressing the propagation of fibrinorous cells. It is also known that aminoacetonitrile is one of the strongest substances known with respect to lathrogenic activity.

The present inventors have conducted studies for overcoming the correlation between liver protection activity, pharmacodynamic activity, and lathyrogenic activity, and have now succeeded in breaking off the correlation and applying only the useful activities thereof to the medical treatment of human diseases.

The above developments are tabulated as follows:

| | Liver Protecting & Antidotal Activity | suppressing effect on Intestine Vermiculation | Lathyrogenic Activity |
|---|---|---|---|
| Aminoacetonitrile | Strong | Strong | Very Strong |
| Amino acid acylated Aminoacetonitrile | Equal to Aminoacetonitrile | 1/10 of Aminoacetonitrile | Half of Aminoacetonitrile |
| Acyl Aminoacid Acylated Aminoacetonitrile of Present Invention | Equal to Aminoacetonitrile | Less than 1/10 of Aminoacetonitrile | Less than ¼ of Aminoacetonitrile |

It should be noted that liver cirrhosis, namely fibrination cannot be suppressed by the complete removal of lathyrogenic activity. Thus, where giving priority to the liver function (for example in cases where it is desired to prevent liver disorder caused by inspirated anesthesia, blood transfusion and so on), a lower lathyrogenic activity is advantageous. This means that the substances of the present invention are more useful in this respect. Meanwhile, where preventing liver cirrhosis tendencies, amino acid acylated aminoacetonitrile is more advantageous.

The preventive effect on liver disorder caused by carbon tetrachloride, of acetyl glycinyl aminoacetonitrile, the simplest one of the substances of the present invention, will be described by way of example, referring to the accompanying drawings.

FIG. 1 and FIG. 2 show the preventive effect, on liver disorder caused by carbon tetrachloride, of a representative substance of the present invention, i.e., acetyl glycinyl aminoacetonitrile.

The two kinds of transaminase shown in FIG. 1 and FIG. 2 will be released in a large amount into the blood serum when the parenchyma of the liver is broken. On the other hand it has been proved by various experiments that the absence of these enzymes in the blood serum indicates no disorder in the parenchyma of the liver. Thus, this has been adopted as a most reliable method for the diagnosis of human liver disease.

It can be seen from FIG. 1 and FIG. 2 that acetyl glycinyl aminoacetonitrile completely prevents the liver disorder which, otherwise is caused by 100 mg/kg of carbon tetrachloride.

The substances to which the present invention relates are synthesized by acylating an amino acid acylated aminoacetonitrile with a suitable acylating agent, such as, for example, acid anhydride acid halide, or acid ester, etc.

This may be shown by Equation (1) as follows:

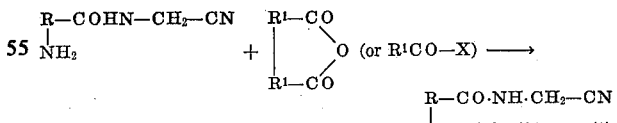

in which

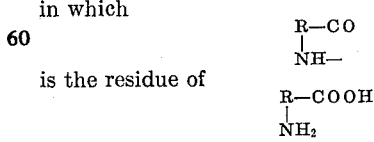

is the residue of representing an amino acid $R^1$ represents a straight or branched chain alkyl, or an aromatic radical and X represents halogen.

When an acid anhydride is used as the acylating agent, the amino radical is easily acylated by reaction of an amino acid acylated aminoacetonitrile (or its acetate) with an acid anhydride such as acetic anhydride, propionic anhydride, butyric anhydride, isobutyric anhydride, etc., without a solvent or in a suitable solvent (preferably aqueous solution), so that the desired acyl amino acid acylated aminoacetonitrile, N-(N-acetyl glycyl)-aminoacetonitrile, for example, is obtained.

When an acid halide, such as acetyl chloride, acetyl bromide, propionyl chloride, butyryl chloride, etc., is used as the acylating agent, it is desirable that a neutralizing agent, such as sodium bicarbonate, sodium carbonate, potassium carbonate, pyridine, triethylamine, etc., be concomitantly used, and that the reaction be carried out in an aqueous solution or in an organic solvent (ether, benzene, alcohol, pyridine, for example). It is particularly advantageous in this case that the reaction take place in an aqueous solution at a temperature between 0°–25° C.

The present invention is hereinafter described in more detail setting forth presently preferred examples.

Amino acid acylated acetonitrile (II) or a derivative thereof, which is the starting material for the present invention, is produced by a method, for example, in which an acid amide synthesized from phthaloyl amino acid and aminoacetonitrile, having the general formula (III), is subjected to the action of hydrazine or its hydrate:

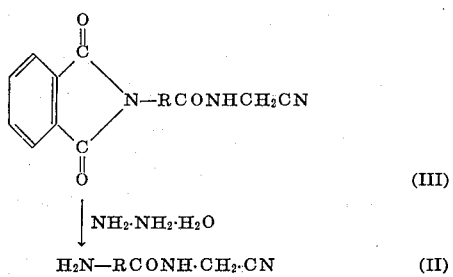

The compound of formula III can be obtained by combining a reactive derivative of phthaloyl amino acid, such as its halide, with aminoacetonitrile. This is shown by the following reaction scheme:

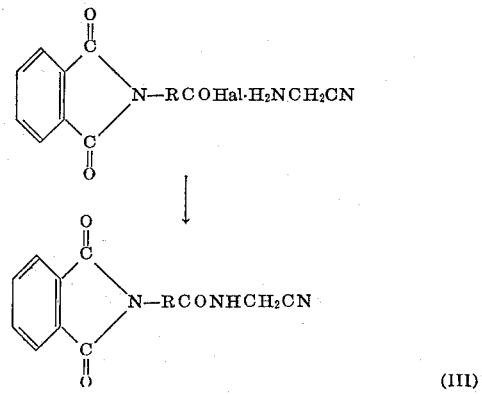

EXAMPLE 1

N-(N-Acetyl Glycyl)-Aminoacetonitrile

One g (gram) of N-glycyl-aminoacetonitrile (or its acetate) is dissolved in 5 cc (cubic centimeters) of water, and 1.5 cc of acetic anhydride is added at one time at room temperature (20° to 30° C) with stirring. After 15 minutes, 1.5 cc of acetic anhydride is again added with stirring for 30 minutes thereafter, and then condensation under diminished pressure is effected. When the resultant crystals are subjected to recrystallization from ethanol 0.8 g of fine plate crystals are obtained. The melting point of this substance is 157°–159° C.

Analysis: calculated C:46.44, H:5.85, N:27.08
found C:46.41, H:5.67, N:27.85

Glycyl-aminoacetonitrile used as starting material in this example can be produced as follows:

Five g of aminoacetonitrile sulphate is dissolved in 100 cc of water, with addition of 12 g of sodium bicarbonate. The resulting solution is cooled to 5° C and 50 cc of dioxan solution of 10 g of phthaloyl glycyl chloride is dropped thereinto with stirring for a period of 30 minutes, during which period crystals precipitate. Then stirring is continued at 5° C for 2 hours and crystals are collected by filtration, washed with water and dried.

White needle crystals are obtained by recrystallization from acetonitrile. The melting point of this substance is between 245° C and 246° C. Analysis: $C_{12}H_9bl3N_3$ Calculated: N 17.28 Found: N 17.57.

Then 7 g of phthaloyl glycyl aminoacetonitrile is added to 50 cc of ethyl alcohol solution of 18 g of 80 percent hydrazine hydrate and heated for 1.5 hours to distil off ethyl alcohol under diminished pressure. The residue is added to 70 cc of aqueous solution of 75 g of conc. hydrochloric acid and the solution is stirred for 5 minutes and cooled. Then undissolved crystals are removed and when the solution is condensed under 40° C, a syruplike residue is obtained.

The residue is dissolved in the least possible amount of methanol with addition of ethyl alcohol. When this solution is left in a refrigerator, 3 g of white crystal of the object substance is obtained.

The melting point of the substance is between 179°–183° C. Analysis: $C_4H_{30}N_3Cl$ Calculated: N 28.05 Found: N 28.87.

EXAMPLE 2

N-(N-Acetyl Glycyl)-Aminoacetonitrile

One g of glycyl-aminoacetonitrile acetate is dissolved in 5 cc of water. Two g of sodium bicarbonate is added and then 1 cc of ether solution of 0.5 g of acetylchloride is dropped into the solution at a temperature between 0 and 5° C while stirring and cooling the solution with ice water. Stirring is continued at a temperature between 0° and 5° C for 30 minutes thereafter, and further stirring is continued at room temperature for 1 hour. Then the reaction solution is filtered and when the filtrate is subjected to condensation under diminished pressure below 40° C, there are left crystals.

These crystals are extracted with hot ethanol, and undissolved substances are filtered off. When the filtrate is cooled, white plate crystals are obtained. The melting point of this substance is 157°–150° C and the amount obtained is 0.6 g. When this substance is mixed with that obtained by Example 1, no lowering of the melting point is observed.

EXAMPLE 3

N-(N-Acetyl-Valyl)-Aminoacetonitrile

Five-hundred mg (milligrams) of N-valyl-aminoacetonitrile acetate is dissolved in 5 cc of water and the solution is treated with two-time addition of 0.75 cc of acetic anhydride in a similar way as in Example 1. The resulting crystals are recrystallized from hot water and 420 mg of white needle crystals having melting point between 187° and 188° C are obtained. Infrared analysis (wave number cm$^{-1}$):

| | | | | |
|---|---|---|---|---|
| $\gamma$ NH | 3380, 3020; | $\gamma$ C=O | 1670, | 1650 |
| $\delta$ NH | 1530, 1550; | $\delta$ CH$_3$ | 1380 | |
| $\delta$ (CH$_3$)$_2$CH-:1160 | | | | |

In this way the crystals are determined to be the object substance.

EXAMPLE 4

N-(N-Acetyl-α-Alanyl)-Aminoacetonitrile

One-hundred mg of N-α-alanyl aminoacetonitrile acetate and 0.15 cc of acetic anhydride are caused to react and treated in a similar way as shown in Example 1 to obtain the object substance. Recrystallized from isopropyl alcohol, 60 mg of white needle crystals, having a melting point between 149°–150° C, are obtained.

| Infrared Analysis (cm$^{-1}$): | NH | 3380 | 3300 |
|---|---|---|---|
| | C=O | 1680 | 1640 |
| | NH | 1570 | 1540 |
| | CH$_3$ | 1380 | 1260 |

Thus, the crystals are determined to be the object substance.

EXAMPLE 5

White needle crystals of N(N-propionyl-glycyl)-aminoacetonitrile having a melting point between 150° and 160° C are obtained similarly, using ethanol as a recrystallization solvent.

EXAMPLE 6

White needle crystals of N-(N-n-butyryl-glycyl)-aminoacetonitrile (M.P. 129°–131° C) are similarly obtained, using ethanol.

EXAMPLE 7

White needle crystals of N-(N-acetyl-alanyl)-aminoacetonitrile (M.P. 149°–150° C) are similarly obtained, using isopropyl alcohol.

EXAMPLE 8

White needle crystals of N-(N-isobutyryl-alanyl)-aminoacetonitrile (M.P. 165°–166° C) are similarly obtained, using ethanol.

EXAMPLE 9

White needle crystals of N-(N-propionyl-valyl)-aminoacetonitrile (M.P. 184°–185° C) are similarly obtained, using ethanol.

EXAMPLE 10

White needle crystals of N-(N-butryl-valyl)-aminoacetonitrile (M.P. 172°–173° C) are similarly obtained, using 30 percent ethanol.

EXAMPLE 11

White needle crystals of N-(N-isobutyryl-valyl)-aminoacetonitrile (M.P. 192°–193° C) are similarly obtained, using ethanol.

EXAMPLE 12

White needle crystals of N-(N-acetyl-β-alanyl)-aminoacetonitrile (M.P. 143°–144° C) are similarly obtained, using ethanol.

EXAMPLE 13

White needle crystals of N-(N-acetyl-methionyl)-aminoacetonitrile (M.P. 109°–111° C) are similarly obtained, using isopropyl-alcohol.

EXAMPLE 14

White needle crystals of N-(N-acetyl-asparaginyl)-aminoacetonitrile (M.P. 195°–196° C) are similarly obtained, using water-ethanol.

EXAMPLE 15

White leaflet crystals of N-(N-acetyl-δ-aminovaleryl)-aminoacetonitrile (M.P. 101° C) are similarly obtained, using ethyl acetate.

The safety and effectiveness of the N-(N-acylaminoacyl)-aminoacetonitriles of the present invention as medicaments will be apparent from the following data.

In Table 1 the effect of the compositions of the present invention on the Lathyrism and body weight in rats as compared with conventional compositions is set forth. The table also demonstrates the effect of the compared compositions on the mortality of the rats.

TABLE 1

Determination of Lathyrogenic Activities (young rats, ten-day administration)

| | Mortality | Body Weight Increase/day | Determination of Lathyrism by X-ray[1] |
|---|---|---|---|
| Normal rat | 0 | 5.3 | — |
| Aminoacetonitrile (200mg/Kg) | 100 | −1.4 | +++ |
| Glycyl Amino-acetonitrile (200mg/Kg) | 10 | −0.2 | ++ |
| Glycyl Amino-acetonitrile (500mg/Kg) | 100 | −0.2 | +++ |
| Acetyl Glycyl Aminoacetonitrile (200mg/Kg) | 0 | 3.9 | ± |
| Benzoyl Glycyl Aminoacetonitrile (200mg/Kg) | 0 | 5.2 | — |

[1]-not lathyritic; + clearly lathyritic; +++ very severely lathyritic; ± slightly lathyritic; ++severely lathyritic The serum-glutamic-oxaloacetic trans-aminase (hereinafter abbreviated as S-GOT) activity and serum-glutamic-pyruvic transaminase (hereinafter abbreviated as S-GPT) activity suppressing effect of the compounds of the invention were determined in the following manner.

Mice were hypodermically injected with an amount corresponding to 0.1 ml/kg of carbon tetrachloride dissolved in olive oil and an amount corresponding to 100 mg/kg of the compounds of the invention, the difficultly soluble compounds being orally dosed. A control group of mice were injected only with carbon tetrachloride. The S-GOT and S-GPT elevation rates of the control group were appraised at 100 percent each. The corresponding values for each group dosed with the compounds of the invention are also set forth in terms of their elevation rate. In addition, the elevation rates of a normal group of mice which were not injected with carbon tetrachloride are also set forth.

The results are set forth in Table 2. In table 3, the results achieved by varying the dosages of the compounds of the invention are set forth.

The data in the Tables below are indicative of the effect of some of the compounds according to the present invention on carbon tetrachloride liver disordered mice.

TABLE 2

| Group | S-GOT elevation rate % | S-GPT elevation rate % | Acute poison to mouse, venous injection, LD mg/kg |
| --- | --- | --- | --- |
| Control Group | 100 | 100 | 50 |
| Normal group | 3.6±0.7 | 0.9±0.8 | |
| N-Acetylglycylamino acetonitrile | 11.8±2.6 | 2.6±0.9 | 4000 |
| N-Acetylvalylamio acetonitrile | 6.5±2.2 | 3.5±1.4 | |
| N-Acetylmethionyl- acetonitrile | 26.6±2.8 | 4.6±0.5 | |
| N-Acetylvalylamio caproylamino- acetonitrile | 27.3±3.0 | 28.4±3.8 | 3000 |
| N-Propionylglycyl- aminoacetonitrile | 13.4±1.9 | 1.1±0.4 | |
| N-n- Butyrylglycylamino acetonitrile 14.6±3.5 | | 3.2±1.3 | |
| N-Acrylylglycylamino- acetonitrile | 3.0±1.2 | 16.7±0.6 | |
| N-Benzoylglycylamino- acetonitrile | 3.9±0.8 | 1.6±0.6 | |

TABLE 3

| N-Isobutyrylalanyl aminoacetonitrile. | Serum-Got % | Serum GPT % |
| --- | --- | --- |
| normal | 32.2 | 1.02 |
| C Cl4 | 100 | 100 |
| 50mg/kg+C Cl4 | 47.7 | 2.04 |
| 100mg/kg+C Cl4 | 37.6 | 1.02 |
| 200mg/kg+C Cl4 | 43.5 | 1.02 |
| N-acetyl phenyl al- anyl AAN (P.O.) | Serum-GOT % | Serum-GPT % |
| normal | 13.7 | 5.3 |
| C Cl4 | 100 | 100 |
| 25mg/kg+C Cl4 | 56.7 | 46.5 |
| 50mg/kg+C Cl4 | 16.4 | 11.6 |
| 100mg/kg+C Cl4 | 25.7 | 15.6 |
| 200mg/kg+C Cl4 | 15.7 | 9.1 |
| acetyl tryptophanyl AAN (P.O.) | LD 50 Mouse P. O. <30 g/kg | |
| | Serum-GOT % | Serum-GPT % |
| normal | 3.8 | 5.2 |
| C Cl4 | 100 | 100 |
| 50mg/kg+C Cl4 | 62.4 | 61.8 |
| 100mg/kg+C Cl4 | 29.8 | 26.9 |
| 200mg/kg+C Cl4 | 27.0 | 32.5 |
| 400mg/kg+C Cl4 | 21.3 | 3.4 |
| N-acetyl methionyl AAN (S.C.) | Serum-GOT % | Serum-GPT % |
| normal | 3.6 | 0.9 |
| C Cl4 | 100 | 100 |
| 100mg/kg+C Cl4 | 26.6 | 4.6 |
| N-acetyl asparagyl AAN (S.C.) | Serum-GOT % | Serum-GPT % |
| normal | 3.6 | 0.9 |
| C Cl4 | 100 | 100 |
| 100mg/kg+C Cl4 | 15.3 | 8.7 |

CCl4 0.1ml/kg. 17 – 24 hr
GOT: Glutamic oxalacetic transaminase
GPT: Glutamic pyruvic transaminase

What is claimed is:

1. N-(N-acylaminoacyl)-aminoacetonitrile of the formula

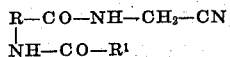

in which

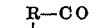

is the radical of

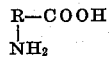

representing an amino acid selected from the group consisting of glycine, α-alanine, β-alanine, α-aminoisobutyric acid, valine, methionine, lysine, aspartic acid, and δ-aminovaleric acid and R'CO represents an acyl radical, R' representing a member selected from the group consisting of straight and branched chain alkyl radicals having from one to four carbon atoms.

2. A compound as in claim 1, said compound being N-(N-acetyl-glycyl)-aminoacetonitrile.

3. A compound as in claim 1, said compound being N-(N-acetyl-valyl)-aminoacetonitrile.

4. A compound as in claim 1, said compound being N-(N-acetyl-a-alanyl)-aminoacetonitrile.

5. A compound as in claim 1, said compound being N-(N-propionyl-glycyl)-aminoacetonitrile.

6. A compound as in claim 1, said compound being N-(N-n-butyryl-glycyl)-aminoacetonitrile.

7. A compound as in claim 1, said compound being N-(N-acetyl-alanyl)-aminoacetonitrile.

8. A compound as in claim 1, said compound being N-(N-isobutyryl-alanyl)-aminoacetonitrile.

9. A compound as in claim 1, said compound being N-(N-propionyl-valyl)-aminoacetonitrile.

10. A compound as in claim 1, said compound being N-(N-butyryl-valyl)-aminoacetonitrile.

11. A compound as in claim 1, said compound being N-(N-isobutyryl-valyl)-aminoacetonitrile.

12. A compound as in claim 1, said compound being N-(N-acetyl-β-alanyl)-aminoacetonitrile.

13. A compound as in claim 1, said compound being N-(N-acetyl-methionyl)-aminoacetonitrile.

14. A compound as in claim 1, said compound being N-(N-acetyl-asparaginyl)-aminoacetonitrile.

15. A compound as in claim 1, said compound being N-(N-acetyl-δ-aminovaleryl)-aminoacetonitrile.

* * * * *